United States Patent
Little et al.

(10) Patent No.: US 10,906,260 B1
(45) Date of Patent: Feb. 2, 2021

(54) SYSTEM FOR PREDICTING AUGER FAILURE IN A TIRE INJECTION FILLING MIXING MACHINE

(71) Applicant: CARLISLE CONSTRUCTION MATERIALS, LLC, Carlisle, PA (US)

(72) Inventors: Jeff Little, Rossville, GA (US); John Bishop, DuBois, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/990,785

(22) Filed: Aug. 11, 2020

Related U.S. Application Data (60) Provisional application No. 62/899,466, filed on Sep. 12, 2019.

(51) Int. Cl.
  *B29D 30/06* (2006.01)
  *B29B 7/14* (2006.01)
  (Continued)

(52) U.S. Cl.
  CPC ............ *B29D 30/0662* (2013.01); *B29B 7/14* (2013.01); *B29B 9/02* (2013.01); *G01M 1/28* (2013.01);
  (Continued)

(58) Field of Classification Search
  CPC ........ B29D 30/0662; B29D 2030/0663; B29D 30/04; B29B 7/14; B29B 9/02; G01M 1/28; G01M 13/045; B60C 7/00; B60C 7/102; B01F 15/00376; B01F 15/00383; B01F 15/00389
  (Continued)

(56) References Cited

U.S. PATENT DOCUMENTS

| 5,238,734 A | 8/1993 | Murray |
| 6,187,125 B1 * | 2/2001 | Rustad .................. B29D 30/04 |
| | | 152/310 |

(Continued)

OTHER PUBLICATIONS

International Searching Authority, International Search Report and Written Opinion for corresponding International Application No. PCT/US2020/045789, dated Oct. 28, 2020, 8 pages.

*Primary Examiner* — Matthew J Daniels
*Assistant Examiner* — Gregory Chad Grosso
(74) *Attorney, Agent, or Firm* — Gordon Rees Scully Mansukhani LLP; David R. Heckadon (57) ABSTRACT

A method of performing preventative maintenance on an auger in a tire filling mixing machine, by: (a) mixing a polyurethane isocyanate and a catalyst in a first mixer to form a virgin polyurethane; (b) grinding polyurethane core bits in a grinder, the grinder having an auger and a motor; (c) mixing the virgin polyurethane and the ground core bits in a second mixer thereby forming a mixed flatproofing material; (d) injecting the mixed flatproofing material into a tire; (e) measuring vibration of the auger; and (f) comparing the measured vibration of the auger to a predefined maximum vibration; and (g) removing the auger from the grinder if the measured vibration exceeds the pre-defined maximum vibration for a predefined period of time, or removing the auger from the grinder if the measured temperature of the auger exceeds the pre-defined maximum temperature for a predefined period of time.

5 Claims, 7 Drawing Sheets

(51) Int. Cl.
   *B29B 9/02*       (2006.01)
   *G01M 1/28*       (2006.01)
   *G01M 13/045*    (2019.01)
(52) U.S. Cl.
   CPC ... *B29D 2030/0663* (2013.01); *G01M 13/045* (2013.01)
(58) Field of Classification Search
   USPC .......................................................... 366/100
   See application file for complete search history.

(56) References Cited

U.S. PATENT DOCUMENTS

| | | | |
|---|---|---|---|
| 6,918,979 B2* | 7/2005 | Shaffer | B29D 30/04 152/310 |
| 7,043,178 B1 | 5/2006 | Taylor et al. | |
| 2010/0143520 A1* | 6/2010 | Pinchot | B29C 48/92 425/142 |
| 2012/0315816 A1 | 12/2012 | Fowler et al. | |
| 2014/0244051 A1* | 8/2014 | Rollins | F04D 19/002 700/282 |
| 2015/0217525 A1 | 8/2015 | Cunningham et al. | |
| 2018/0030931 A1* | 2/2018 | Benge | F04D 17/12 |

\* cited by examiner

SYSTEM FOR PREDICTING AUGER FAILURE IN A TIRE INJECTION FILLING MIXING MACHINE

RELATED APPLICATION

The present application claims priority to U.S. Provisional Patent Application Ser. 62/899,466, of same title, filed Sep. 12, 2019; the entire disclosure of which is incorporated herein by reference in its entirety for all purposes.

TECHNICAL FIELD

The present invention relates generally to equipment for flatproofing tires by injecting a mixed flatproof material into the tires, and in particular to auger systems for grinding up rubber core bits for use in the mixed flatproof material.

BACKGROUND OF THE INVENTION

The Applicant has previously developed novel systems for mixing materials to form a flatproofing material that was injected into tires. Examples of these novel systems are set forth in U.S. Pat. Nos. 6,988,524 and 6,918,979, incorporated herein by reference. In these systems, the machine first grinds up used tire pieces and then mixes these ground tire pieces together with a liquid virgin rubber material (such as polyurethane) to form a flatproofing mixture. This flatproofing mixture is then injected into the core of a tire through an attached injector. The flatproofed tire is then allowed to cure (typically for 24 hours) such that the flatproofing mixture solidifies in the tire and then tire is then ready for use.

These existing systems operate with a first mixer that mixes isocyanate and a catalyst to form a virgin rubber/polyurethane. The resulting virgin polyurethane is then mixed with ground up rubber core bits (from recycled tires) in a second mixer to form the final flatproofing material. The grinder that has an auger in it and the recycled tires are dropped from a hopper down onto the auger where they are then ground up into small pieces. A wire screen at the end of the auger ensures that none of the ground up pieces are larger than a desired diameter in size when these ground up pieces are mixed with the virgin polyurethane.

As can be appreciated, the auger in the grinder must be strong and durable and constructed to endure considerable wear and tear. Failure of the auger results in a shutdown of the entire tire filling system. It would therefore be desirable to monitor its operation so as to prevent auger failure. Having the ability to spot auger problems well in advance of auger failure would enable the system operators to schedule preventative repair and/or replacement. Specifically, system operators would be able to replace and/or repair the auger during normal downtime. In addition, spotting auger problems well ahead of time would give system operators the ability to re-order a new auger for installation prior to the auger failing and the whole system shutting down.

As will be explained, the present system can be used to predict auger failure, such that countermeasures can be taken in a timely fashion.

SUMMARY OF THE INVENTION

In preferred aspects, the present system provides a method of performing preventative maintenance on an auger in a tire filling mixing machine, comprising:

(a) mixing a polyurethane isocyanate and a catalyst in a first mixer to form a virgin polyurethane;

(b) grinding cured polyurethane core bits in a grinder, the grinder having an auger and a motor;

(c) mixing the virgin polyurethane and the ground polyurethane core bits in a second mixer thereby forming a mixed flatproofing material;

(d) injecting the mixed flatproofing material into a tire;

(e) measuring at least one of vibration or temperature of the auger; and then performing one or both of:

(i) comparing the measured vibration of the auger to a pre-defined maximum vibration and removing the auger from the grinder if the measured vibration exceeds the pre-defined maximum vibration for a pre-defined period of time; or (ii) comparing the measured temperature of the auger to a pre-defined maximum temperature and removing the auger from the grinder if the measured temperature exceeds the pre-defined maximum temperature for a predefined period of time.

Preferably, the vibration in the auger is measured by accelerometers positioned at the front and rear ends of the auger. The vibration level is then checked routinely such that it is possible to build a vibration history for each individual grinder machine. As such, operators can then use historical data to determine which vibration levels are unacceptable such that suitable alarms, and shutdown levels can be determined. In addition, maximum acceptable vibration levels can optionally be correlated with the amount of time that the maximum acceptable vibration level has been exceeded. As such, if the vibration just slightly exceeds the maximum acceptable amount the system can be kept operating for a longer period of time. Conversely, the system can be shut down faster if the vibration greatly exceeds the maximum acceptable amount of vibration for a shorter period of time.

The present inventors have experimentally determined that continuous vibration levels above 0.14 gRMS or approximately 25% above normal vibration range indicate a potential auger related issue. Such auger related issues can include problems with the auger components (both blade and shaft), the bearings, the gearbox, and/or the motor. When such issues are noted by the present control system, it can automatically alert technical support staff.

Preferably as well, the system will be shut down if the temperature exceeds the pre-defined maximum temperature a pre-determined period of time. The temperature of the auger can be measured with thermocouples also mounted to the front and rear ends of the auger. In preferred embodiments, the vibration sensing accelerometers and the thermocouples may be housed together in a single sensor body. In addition, the present inventors have determined that a significant temperature increase in one bearing or the gearbox over the motor or the opposing bearing assists in determining shaft/blade versus rear or discharge bearing. When these temperatures conditions pass predetermined acceptable levels, the present system preferably notifies technical support staff. Additionally, by using motor temperature, torque, and amperage, the present system preferably shuts down preventing extensive damage the grinder section of the machine.

In optional embodiments, the system may omit outlier readings. For example, an outlier temperature reading setting and an outlier vibration reading setting may be pre-input into the system. Should the system measure a temperature or vibration in excess of these outlier settings, the measured temperature or vibration reading will simply be ignored. The advantage of this approach is that a single outlier reading (of vibration or temperature) would not simply shut down the whole system operation. In addition, the present system preferably ignores high value outliers when they are temporary in nature, thereby allowing the machine to effectively grind through the hardest material in use.

In preferred aspects, the vibration and temperature of the auger are measured with sensors positioned both on auger bearings and on the grinder motor and gearbox.

In additional preferred aspects, the performance of the motor in the grinder is also monitored and the motor is stopped if the performance of the motor remains outside a pre-defined performance range for a pre-defined period of time. Optionally, measuring the performance of the motor may involve measuring at least one of: (a) amperage of the motor, (b) speed of the motor, (c) vibration of the motor, (d) temperature of the motor, (e) and the magnetic field of the motor.

In additional preferred aspects, the level of polyurethane core bits in the grinder is measured with an analog ultrasonic level sensor and the system automatically adjusts the speed of the catalyst pump, the speed of the isocyanate pump, and the speed of the injector based upon the available volume of rubber to grind. This prevents an unacceptable ratio of ground up rubber to virgin material from being injected into the tire. Specifically, the present system shuts down the grinder and the first and second mixers if the detected level of rubber core bits in the grinder falls below a pre-determined minimum level. By measuring the system against time, usage and measuring the grinding ratios, automatic cycling can be accomplished to provide a continuous flow of crumb at the appropriate ratio and volume. If crumb level triggers a crumb low condition, the present system automatically reduces system speed to maintain the correct ratio at a reduced volume. In addition, if the crumb level drops into a "Low Low" range, the present systems automatically stop, thus preventing undesired ratio fluctuation.

DETAILED DESCRIPTION OF THE FIGURES

Figure 1:
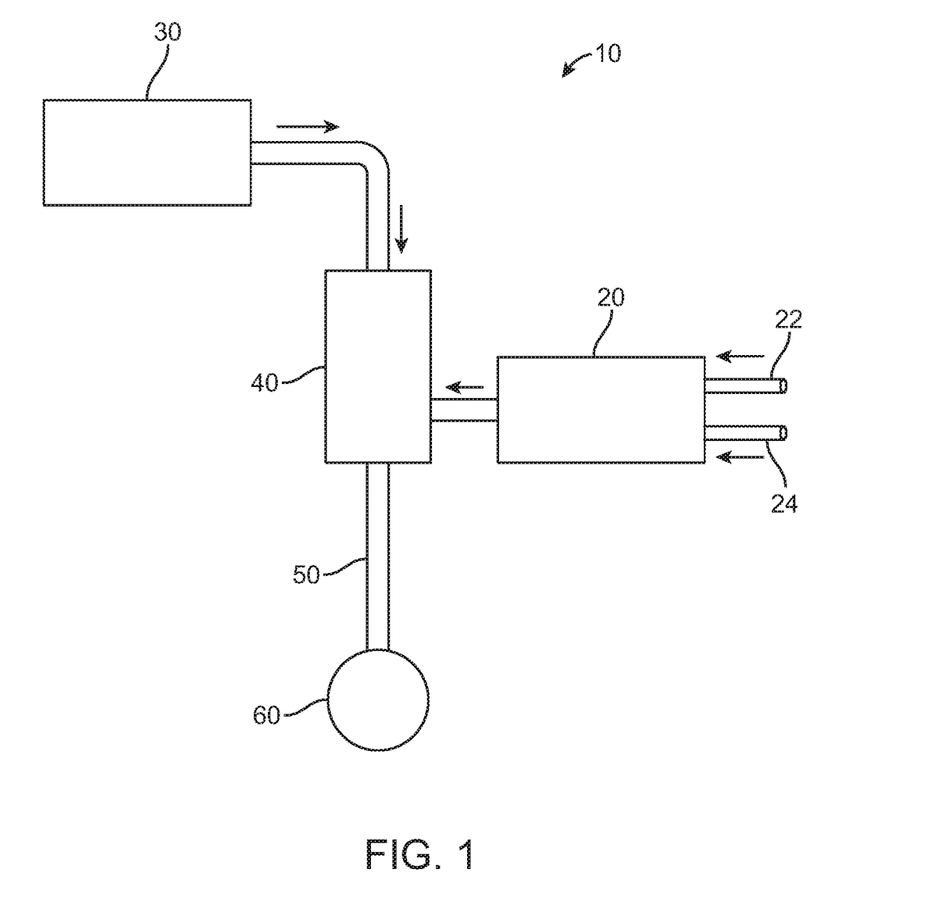
FIG. 1 is a flow schematic of the present system, explaining its operation.
Figure 2A:
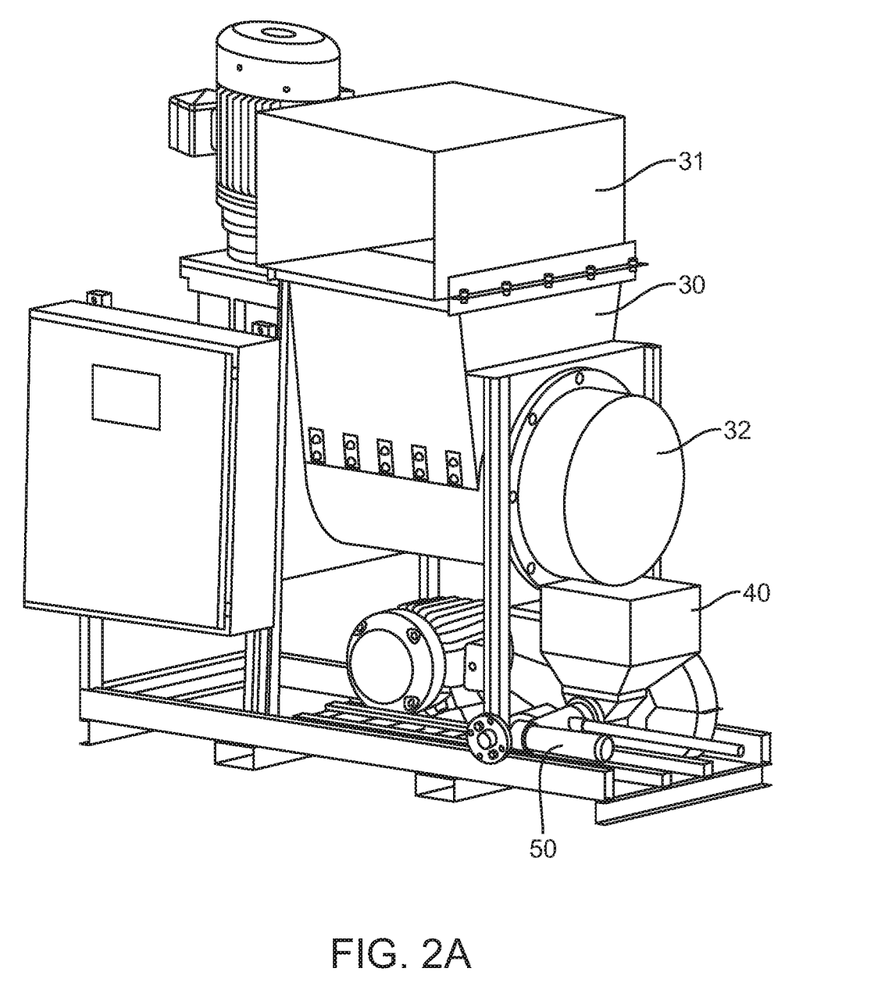
FIG. 2A is a perspective view of the present system.
Figure 2B:
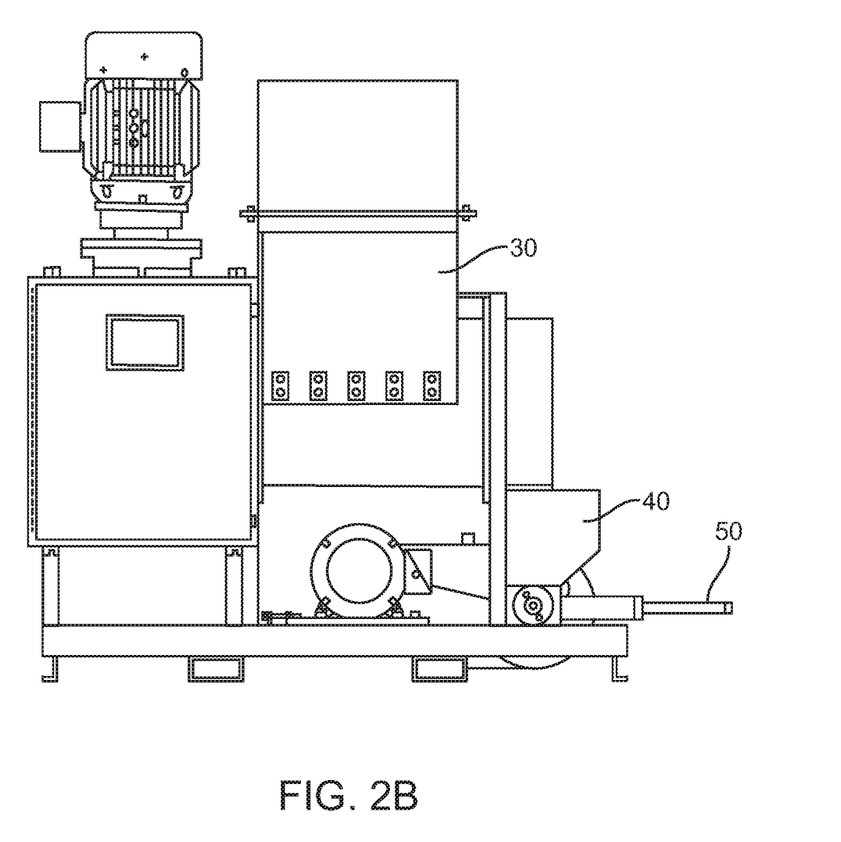
FIG. 2B is a side elevation view of the present system.
Figure 2C:
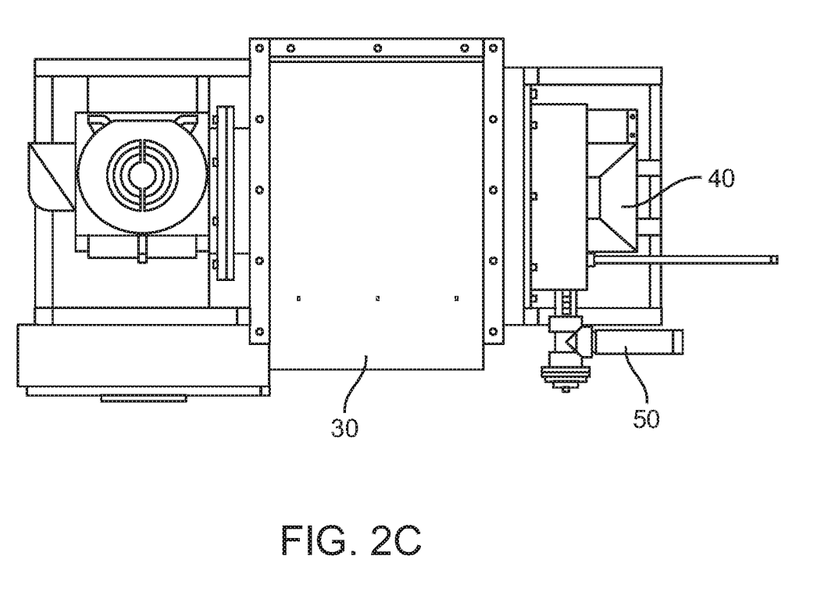
FIG. 2C is a top plan view of the present system.
Figure 2D:
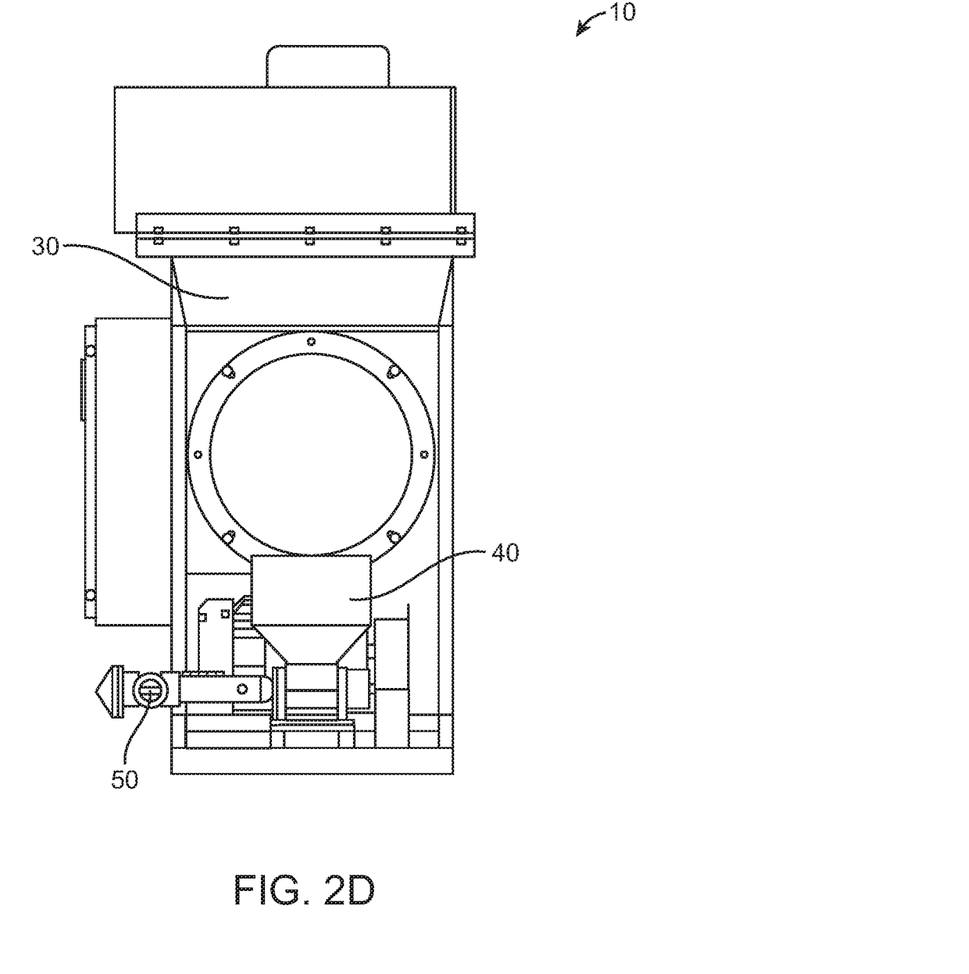
FIG. 2D is a front elevation view of the present system.

FIG. 1 is a flow schematic of the present system, explaining its operation, as follows. Tire filling system 10 comprises a first mixer 20 which receives an isocyanate into an inlet 22 and a catalyst into inlet 24. First mixer 20 mixes the isocyanate and catalyst to form a virgin polyurethane.

A grinder 30 grinds rubber core bits therein. These rubber core bits preferably come from pre-used tires. An exemplary auger 32 (FIGS. 3A and 3B) is disposed within grinder 30 for grinding the core bits down to a preferred small size. In preferred aspects, the ground core bits may have a diameter of ½ inch or less. This small dimension can be achieved by passing the ground rubber bits through the auger 32 and then passing through a screen having ½ inch holes. In preferred aspects, grinder 30 has an upper hopper 31 into which large pieces of rubber are inserted.

The ground polyurethane core bits from grinder 30 and the virgin material from first mixer 20 are than mixed together in second mixer 40 to form a tire flatproofing material that is then passed through an injector 50 into a tire 60. Tire 60 may be either a tubed or tubeless tire. Injector 50 may be a screw-type injector. A pump will also accompany injector 50.

FIGS. 2A to 2D illustrate further views of the present system 10 in which a control system and method of controlling operation of tire filling mixing machine 10 is provided. This method first comprises: (a) mixing a polyurethane isocyanate and catalyst in first mixer 20 to form a virgin polyurethane; (b) grinding polyurethane core bits in grinder 20; (c) mixing the virgin polyurethane and the ground core bits in second mixer 40 thereby forming a mixed flatproofing material; (d) injecting the mixed flatproofing material into tire 60.

It is to be understood that "a cured polyurethane core bit" as used herein is understood to refer to herein any of a cured virgin polyurethane, a cured virgin polyurethane and a used polyurethane either in chunks or in granules, a cured virgin polyurethane blended with crumb rubber particles, or a blend of any of these.

Figure 3A:
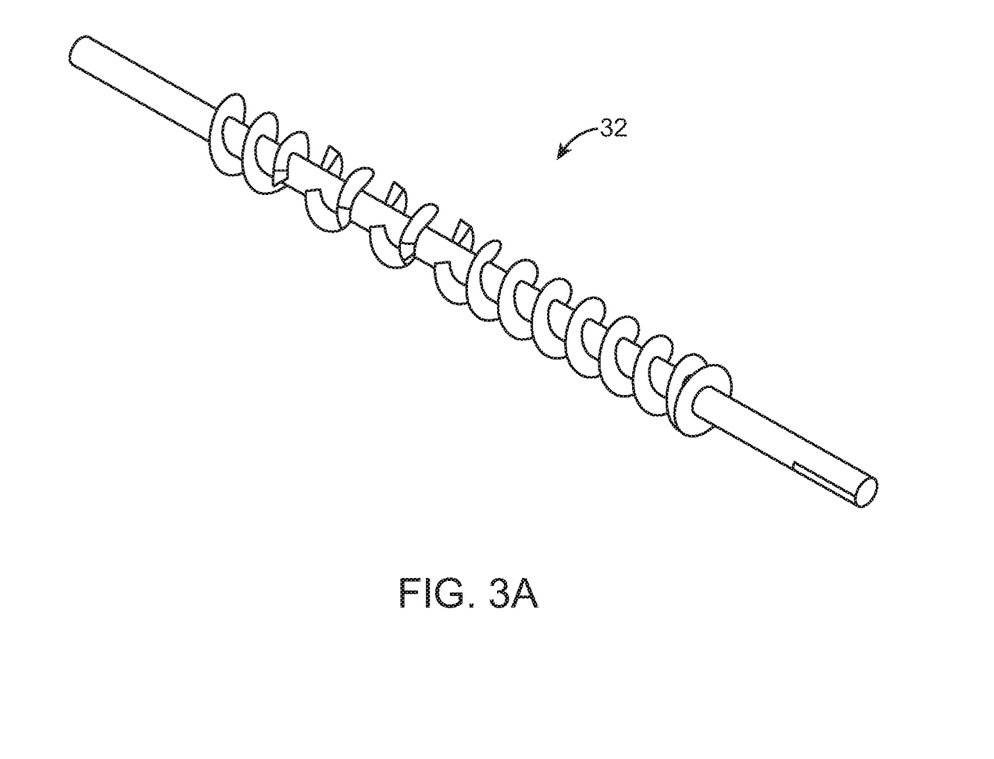
FIG. 3A is an illustration of an exemplary auger for use with the present system.
Figure 3B:
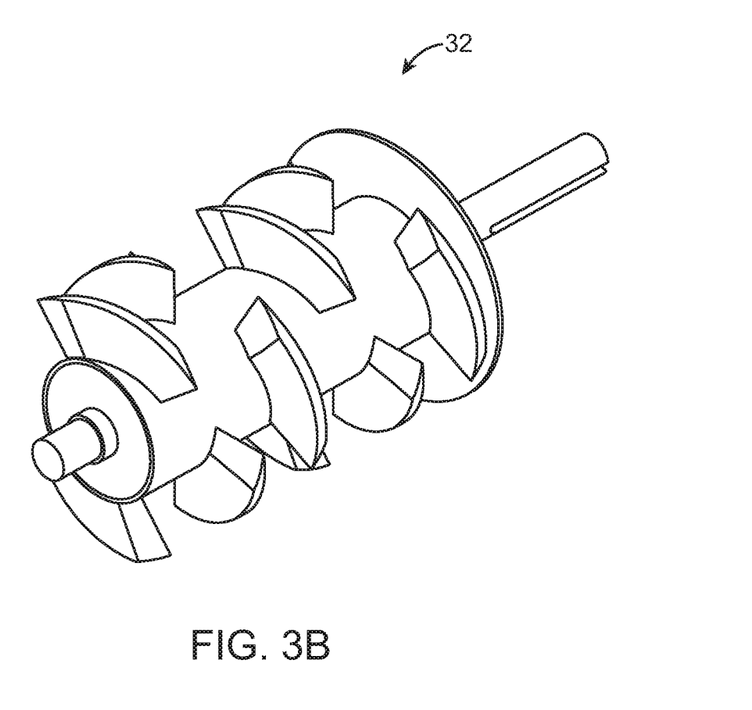
FIG. 3B is a close-up illustration of the exemplary auger of FIG. 3A (showing further details of the auger).

FIGS. 3A and 3B are illustrations of an exemplary auger for use with the present system. Preferably, such measurements are taken at the opposite ends of the auger; however, additional sensor locations at the auger motor and/or gearbox are also contemplated within the scope of the present system.

In preferred aspects, the present system operates by performing preventative maintenance on an auger in a tire filling mixing machine, by:
(a) mixing a polyurethane isocyanate and a catalyst in a first mixer 20 to form a virgin polyurethane;
(b) grinding polyurethane core bits in a grinder 30, grinder 30 having an auger 32 and a motor;
(c) mixing the virgin polyurethane and the ground polyurethane core bits in a second mixer 40 thereby forming a mixed flatproofing material;
(d) injecting the mixed flatproofing material into a tire 60; and
(e) measuring at least one of vibration or temperature of the auger; and then performing one or both of:
(i) comparing the measured vibration of the auger to a pre-defined maximum vibration and removing the auger from the grinder if the measured vibration exceeds the pre-defined maximum vibration range for a predefined period of time; or
(ii) comparing the measured temperature of the auger to a pre-defined temperature range and removing the auger from the grinder if the measured temperature remains outside the pre-defined vibration range for a predefined period of time.

As such, the vibration is measured by an accelerometer and the temperature by a thermocouple. The accelerometer and thermocouple may optionally be housed together in a single sensor body.

Should an excessive level of vibration continue for a predefined period of time, then the present system will automatically shut down grinder 30, stopping the movement of auger 32. Similarly, should the temperature of the auger exceed its preferred maximum temperature for a predefined period of time, then the present system will automatically shut down grinder 30, stopping the movement of auger 32. The present inventors have experimentally determined that if the auger bearing vibration exceeds 0.14 gRMS and a 160 degree Fahrenheit temperature or the discharge bearing exceeds 0.14 gRMS and a temperature greater than 200 degrees Fahrenheit, or the gearbox exceeds 0.10 gRMS and a 150 degree Fahrenheit temperature, a warning should be sent. Accordingly, should these conditions develop, the present system then automatically notifies technical support staff regarding the current condition.

In other preferred aspects, the present system also performs preventative maintenance on the auger by:
(i) measuring performance of the motor in the grinder, wherein measuring the performance of the motor comprises measuring at least one of:
amperage of the motor,
speed of the motor,
vibration of the motor,
temperature of the motor,
a magnetic field of the motor, and
sounds emanating from the motor; and
(ii) stopping the motor if the measured performance of the motor remains outside a pre-defined performance range for a pre-defined period of time.

In preferred aspects, the present system independently monitors the overall grinder performance based on speed, torque, and calculated temperature. As such, the present control system can automatically stop the motor prior to a damaging conditions. This independent system compliments the trending and preventative maintenance system.

Optionally as well, the present system may also (a) measure the level of rubber core bits in the grinder, and (b) automatically shut down the grinder and the first and second mixers if the detected level of core bits in the grinder falls below a pre-determined minimum level. In addition to simply using a minimum level, the present system can use a combination of current ratio, weight, crumb level, and speed when determining whether to shut down the grinder.

In addition, sensors (such as an ultrasound sensor) can be added to the hopper 31 to detect the level of rubber crumb in the hopper. Should the level drop too far, the sensor(s) can be used to automatically shut down the system operation. This has the beneficial effect of preventing virgin material from being wasted when the recycled rubber crumb supply drops in the machine. Since rubber crumb is loaded into hopper 31 in bulk lots, this also ensures that the ratio of ground rubber crumb to virgin rubber material remains consistent.

What is claimed is:
1. A method of performing preventative maintenance on an auger in a tire filling mixing machine, comprising:
(a) mixing a polyurethane isocyanate and a catalyst in a first mixer to form a virgin polyurethane;
(b) grinding polyurethane core bits in a grinder, the grinder having an auger and a motor;
(c) mixing the virgin polyurethane and the ground polyurethane core bits in a second mixer thereby forming a mixed flatproofing material;
(d) injecting the mixed flatproofing material into a tire;
(e) measuring vibration of the auger; and
(f) comparing the measured vibration of the auger to a predefined maximum vibration; and
(g) removing the auger from the grinder if the measured vibration exceeds the pre-defined maximum vibration for a predefined period of time.

2. The method of claim 1, further comprising:
(h) measuring the temperature of the auger; and
(i) comparing the measured temperature of the auger to a pre-defined maximum temperature; and
(j) removing the auger from the grinder if the measured temperature of the auger exceeds the pre-defined maximum temperature for a predefined period of time.

3. The method of claim 1, wherein the vibration and temperature of the auger are measured with sensors positioned on auger bearings and on the grinder motor.

4. The method of claim 1, further comprising:
(h) measuring performance of the motor in the grinder, wherein measuring the performance of the motor comprises measuring at least one of:
amperage of the motor,
speed of the motor,
vibration of the motor,
temperature of the motor,
a magnetic field of the motor, and
sounds emanating from the motor; and
(i) stopping the motor if the measured performance of the motor remains outside a pre-defined performance range for a pre-defined period of time.

5. The method of claim 1, further comprising:
(h) measuring the level of rubber core bits in the grinder, and
(i) automatically shutting down the grinder and the first and second mixers if the detected level of rubber core bits in the grinder falls below a pre-determined minimum level.

* * * * *